No. 12,725. REISSUED NOV. 26, 1907.

R. G. INWOOD & P. C. LAVENBERG.

BOX.

APPLICATION FILED JUNE 13, 1907.

2 SHEETS—SHEET 1.

Witnesses:
Chas. E. Gaylord.
Chas. H. Buell

Inventors:
Richard G. Inwood
Perry C. Lavenberg,
By Dyrenforth, Lee, Christton & Willis,
Att'ys.

No. 12,725. REISSUED NOV. 26, 1907.

R. G. INWOOD & P. C. LAVENBERG.

BOX.

APPLICATION FILED JUNE 13, 1907.

2 SHEETS—SHEET 2.

Witnesses:
Chas. E. Gaylord.
Chas. H. Bull.

Inventors:
Richard G. Inwood
Perry C. Lavenberg,
By Dyrenforth, Lee, Christy & Wiles,
Att'ys.

UNITED STATES PATENT OFFICE.

RICHARD G. INWOOD AND PERRY C. LAVENBERG, OF SOUTH BEND, INDIANA, ASSIGNORS TO THE NATIONAL WIRE BOUND BOX COMPANY, OF SOUTH BEND, INDIANA, A CORPORATION OF INDIANA.

BOX.

No. 12,725. Specification of Reissued Letters Patent. Reissued Nov. 26, 1907.

Original No. 799,854, dated September 19, 1905, Serial No. 228,765. Application for reissue filed June 13, 1907. Serial No. 378,881.

*To all whom it may concern:*

Be it known that we, RICHARD G. INWOOD and PERRY C. LAVENBERG, both citizens of the United States, residing at South Bend, in the county of St. Joseph and State of Indiana, have invented a new and useful Improvement in Boxes, of which the following is a specification.

Our invention relates to certain improvements in wire bound boxes, especially of that class in which the blanks constituting the four sides of the box are assembled and secured in relative position to each other prior to folding by reinforcing wires, and has for its object the assembling and fastening together such parts constituting the completed blank so that the same when folded will produce overlapping edges of the side sheets or boards, the advantages of which will be hereafter pointed out.

Figure 1:
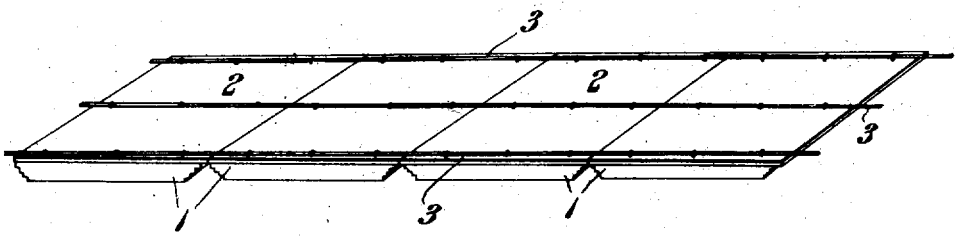
Figure 2:
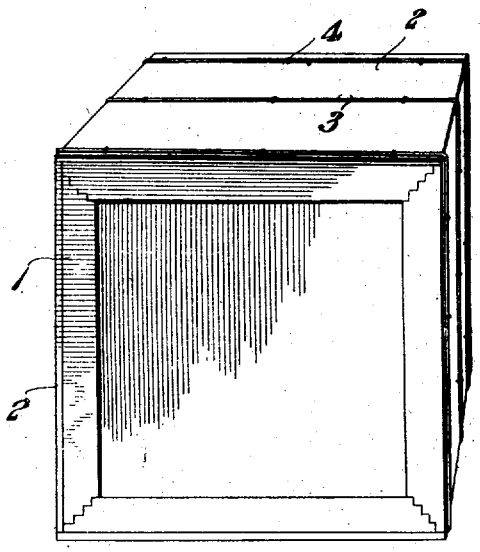
Figure 3:
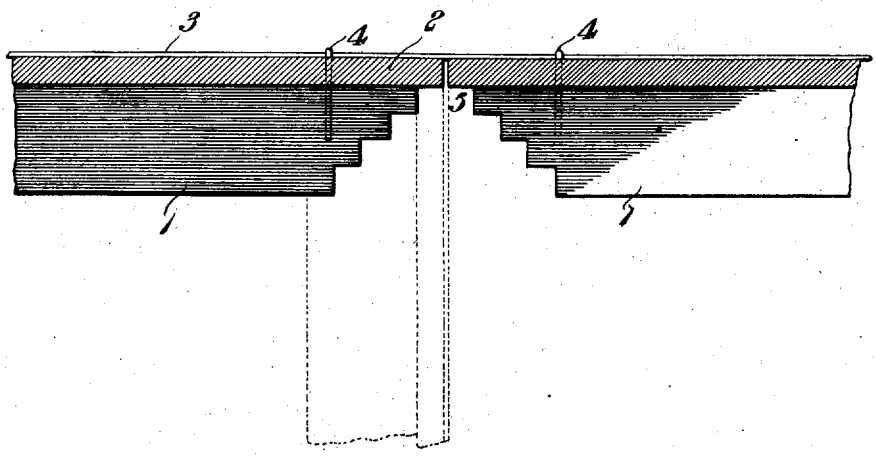
Figure 4:
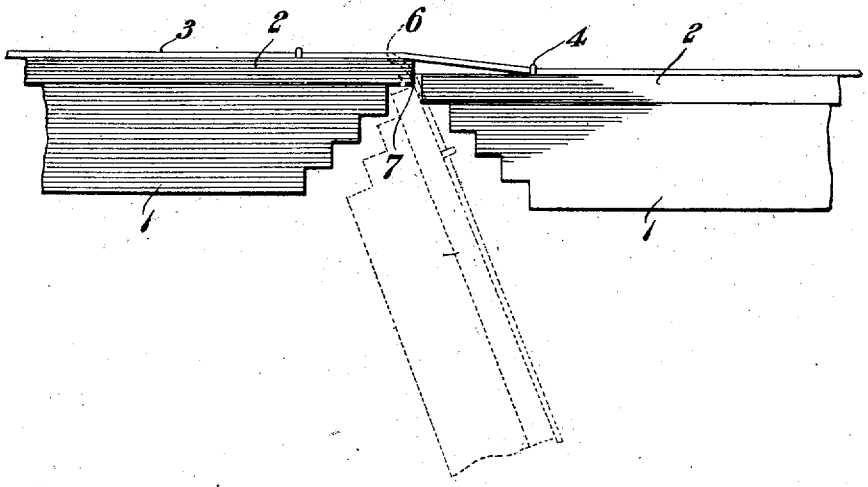

Referring to the drawings:—Figure 1 shows a complete box blank which forms the four sides of a box when folded. Fig. 2 is a perspective view of the blank when folded showing the sides thereof overlapping and box end in place. Fig. 3 shows two enlarged sections of the blank the full lines before folding and the dotted lines a section folded at right angles to the other in making a joint, the full lines also showing the spacing of the cleats and sheets with relation to each other. Fig. 4 shows an enlarged fragmental view of two sections, and the radius of movement relative to each other at different stages in the action of folding.

In the drawings 1 are the cleats which are step-mitered at their ends.

2 are the box sides or sheets which are disposed upon the cleats, and 3 are reinforcing wires which are positioned coincident with the cleats and staples 4 driven straddling of said wires through the sheets into the cleats, the reinforcing wires thereby also serving to hinge the four sections comprising the completed blank together.

The ends of the cleats 1 are spaced a distance apart measured from the adjoining edges of the sheets, equal to the thickness of such sheets, as at 5 so when the blank is folded to form the four sides of a box, the sheets will overlap, and form a square cornered box, as shown in Fig. 2.

It may appear from the drawing that difficulty would be experienced in folding the sections owing to the edges of the sheets abutting, and the same being held in that relative position and against movement away from each other by the reinforcing wires. It is found in practice, however, the sheets being of soft wood veneering, that in folding over one section on the other, the reinforcing wire will cut into the sharp edges of the sheets, as shown at 6 in Fig. 4, and the end of one sheet will crush the inner edge of the adjoining sheet sufficiently, as at 7 Fig. 4, so as to allow same to pass each other, and fold over so as to form overlapping edges or joints.

The present method of manufacturing wire-bound boxes is to form the blank of a single sheet stitched or stapled to single piece cleats for each end of the box, the cleats being stepmitered and the sheets scored or grooved on the under side, so as to form four sections, after the cleats, sheets and reinforcing wires have been stapled together. This box blank when folded forms a rounding edge, the veneer sheets if not thoroughly seasoned so as to have pliability, begin to check as the lumber seasons. As the grain of the wood may be diagonal to the edge of the box, the check will follow the grain, thus rendering the box unsightly, besides a possible opening of a size so as to preclude its use for goods requiring a tight jointed box.

We claim as our invention, and desire to secure by Letters Patent—

1. A wire-bound foldable box-blank, comprising a plurality of straight-edged sheets, wires secured to and connecting said sheets, and cleats secured to said sheets to terminate short of edges of the latter a distance equal or approximately equal to the thickness of a sheet, whereby when folded at a right-angle the end of one sheet overlaps the end of an adjacent sheet.

2. A wire bound foldable box blank, comprising a plurality of straight edged sheets, wires secured to and connecting said sheets, and step-mitered cleats secured to said sheets to terminate short of edges of the latter a distance equal to the thickness of a sheet, whereby when folded at a right angle the end of one sheet overlaps the end of an adjacent sheet.

RICHARD G. INWOOD.
P. C. LAVENBERG.

Witnesses:
BLANCHE RESSLER,
J. E. WHITEHALL.